(12) United States Patent
Betensky (10) Patent No.: US 6,414,802 B1
(45) Date of Patent: Jul. 2, 2002

(54) INVERSE TRIPLET LENS ASSEMBLIES

(75) Inventor: Ellis I. Betensky, Toronto (CA)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/701,718

(22) PCT Filed: Jun. 4, 1999

(86) PCT No.: PCT/US99/12658

§ 371 (c)(1),
(2), (4) Date: Dec. 1, 2000

(87) PCT Pub. No.: WO99/63379

PCT Pub. Date: Dec. 9, 1999

Related U.S. Application Data (60) Provisional application No. 60/088,055, filed on Jun. 5, 1998, now abandoned.

(51) Int. Cl.[7] ............... G02B 13/04; G02B 13/18; G02B 9/12
(52) U.S. Cl. ............... 359/753; 359/716; 359/784
(58) Field of Search ............... 359/715, 716, 359/753, 781, 784

(56) References Cited

U.S. PATENT DOCUMENTS

| 4,109,995 A | 8/1978 | Betensky | 359/716 |
|---|---|---|---|
| 4,781,449 A | 11/1988 | Hirakawa et al. | 359/753 |
| 5,204,781 A | 4/1993 | Ishibai et al. | 359/708 |
| 5,251,073 A | 10/1993 | Schauss | 359/715 |
| 5,446,592 A | 8/1995 | Kohno et al. | 359/689 |
| 5,617,255 A | 4/1997 | Yamada | 359/784 |
| 6,101,044 A | 8/2000 | Ori et al. | 359/621 |

FOREIGN PATENT DOCUMENTS

| JP | 11-084234 | 3/1999 | G02B/13/18 |
|---|---|---|---|

*Primary Examiner*—Georgia Epps
*Assistant Examiner*—David N. Spector
(74) *Attorney, Agent, or Firm*—Maurice M. Klee (57) ABSTRACT

Objective lenses employing three lens units U1, U2, U3 having a negative (or weak positive); positive; negative optical power configuration are disclosed. The lenses have a total field coverage of at least 50 degrees with a relative aperture of less than f/5. They employ small lens elements having aspherical surfaces and are designed for mass production, particularly using plastic optical materials. Designs for these lenses do not exist in all-spherical form, because the aberrations, particularly distortion, cannot be sufficiently corrected; however, by using a sufficient number of aspherical surfaces, not only can the aberrations be corrected to a higher degree than a conventional aspherized triplet design, but the sensitivity of the design to manufacturing deviations can also be minimized. Optionally, these lenses can include a fourth lens unit U4 which provides an extended pupil, which is desirable when the lens is used with a digital light sensor

33 Claims, 9 Drawing Sheets

INVERSE TRIPLET LENS ASSEMBLIES

CROSS REFERENCE TO RELATED APPLICATIONS

This application is the U.S. national phase of International Application No. PCT/US99/12658, filed Jun. 4, 1999, and claims the benefit under 35 USC §119(e) of U.S. Provisional Application No. 60/088,055, filed Jun. 5, 1998, the contents of both of which in their entireties are hereby incorporated by reference.

International Application No. PCT/US99/12658 was published in English as WO 99/63379 on Dec. 9, 1999.

FIELD OF THE INVENTION

This invention relates to objective lenses that contain aspherical surfaces and are designed to be manufactured in high volumes.

More particularly, the invention relates to an inverse triplet objective lens which:

(1) has a negative (or weak positive), positive, negative configuration;

(2) uses aspherical surfaces to correct primary aberrations; and (3) uses aspherical surfaces to reduce manufacturing sensitivities by reducing the amount of aberration correction contribution by an individual lens element.

In certain embodiments, the negative (or weak positive), positive, negative configuration is followed by a positive lens unit which serves to provide the lens with an extended exit pupil.

BACKGROUND OF THE INVENTION

It is well know that the classical triplet (see FIG. 6A and Table 6) can be corrected for all of the primary aberrations, but because there is a residual secondary astigmatism that is not correctable, the performance is limited by astigmatism. If the specifications for the lens are "pushed" too far, the astigmatism is so severe that the depth of focus becomes very shallow (see FIG. 6B), and the lens becomes very difficult to manufacture simply because any manufacturing variations will further reduce this already shallow depth.

A further disadvantage of the triplet design is that the spherical aberration and astigmatism correction are both achieved because the negative element introduces just the "right" amount of aberration of the opposite sign to cancel the effects of the two positive elements. This means that strongly aberrated lenses must be located properly, without tilts or decentrations, or the aberrations will not completely cancel each other, as demonstrated by the through-focus MTF for a decentered second element shown in FIG. 6C.

There are many four element lens types that are much better than the classical triplet and are usually employed to achieve higher performance than the triplet, but with some increase in cost. Even employing aspherical surfaces only results in limited improvement of a classical triplet because the stop is located too close to the negative element for the astigmatism to be corrected and the manufacturing sensitivity problem still remains.

SUMMARY OF THE INVENTION

In view of the foregoing, it is an object of the invention to provide improved objective lenses. More particularly, it is an object of the invention to provide objective lenses having improved aberration correction and reduced sensitivity to manufacturing variations. It is a further object of the invention to provide objective lenses which use a minimum of lens elements, e.g., three or four elements, where, preferably, all of the lens elements are composed of moldable materials and have aspherical surfaces.

To achieve the foregoing and other objects, the invention in accordance with certain of its aspects provides an optical system for producing an image of an object, said system having an overall positive optical power "$\Phi_0$", an overall positive focal length "$f_0$" ($f_0=1/\Phi_0$), an object side, and an image side, and comprising in order from its object side to its image side of:

(a) a first lens unit (U1) having a negative power or a weak positive power (i.e., a positive power which is less than 0.3 times the overall positive power of the optical system and preferably is less than 0.2 times the overall positive power) and an object side surface and an image side surface;

(b) a second lens unit (U2) having a positive power and an object side surface and an image side surface;

(c) a third lens unit (U3) having a negative power, the magnitude of the focal length of the third lens unit being less than 1.5 times the overall positive focal length of the optical system;

(d) an aperture stop (AS) between the object side surface of the first lens unit and the image side surface of the second lens unit; and (e) at least one aspherical surface.

In certain preferred embodiments, the optical system has some or all of the following characteristics, either separately or in combination:

(1) each of the first, second, and third lens units comprises at least one aspherical surface;

(2) at least two of the first, second, and third lens units comprises two aspherical surfaces;

(3) each of the first, second, and third lens units comprises two aspherical surfaces;

(4) each of the first, second, and third lens units consists of a single lens element;

(5) the operative imaging components of the optical system, i.e., the components with optical power, consist of just the first, second, and third lens units;

(6) the operative imaging components of the optical system, i.e., the components with optical power, consist of just the first, second, and third lens units and each of those units consists of a single lens element;

(7) the optical system comprises a fourth lens unit (U4) on the image side of the third lens unit, said fourth lens unit having a positive power;

(8) the fourth lens unit comprises at least one aspherical surface;

(9) each of the first, second, third, and fourth lens units consists of a single lens element;

(10) the operative imaging components of the optical system, i.e., the components with optical power, consist of just the first, second, third, and fourth lens units;

(11) the operative imaging components of the optical system, i.e., the components with optical power, consist of just the first, second, third, and fourth lens units and each of those units consists of a single lens element;

(12) all lens elements used in the optical system are made from moldable materials, e.g., plastics or moldable glasses;

(13) the back focal length of the optical system is at least 0.5 times the overall positive focal length of the optical system;

(14) the exit pupil of the optical system is located at a distance from the image of at least 2 times the overall positive focal length of the optical system;

(15) the distance from the object side of the first lens unit to the image is less than 2 times the overall positive focal length of the optical system;

(16) at least one surface of the lens element nearest the image has an inflection;

(17) the optical system has a half field of view in the direction of the object of at least 25°;

(18) the optical system has a relative aperture of less than f/5, e.g., a relative aperture of f/4 or f/3.5;

(19) the optical system is used as a taking lens for a digital light sensor; and (20) the optical system comprises sufficient aspherical surfaces to substantially correct third and fifth order aberrations and to substantially reduce the system's sensitivity to manufacturing deviations (tolerances).

BRIEF DESCRIPTION OF THE DRAWINGS

Prescriptions for the lenses of FIGS. 1–6 are set forth in Tables 1–6, respectively. The prescriptions of these tables use the "OSLO" format of the optical design program sold under that trademark by Sinclair Optics Inc., Rochester, N.Y.

The symbols used in the MTF plots have the following meanings: plus sign (+)—on-axis; upward facing triangle (Δ)—0.7 field tangential; downward facing triangle (∇)—0.7 field sagittal; square (□)—full field tangential; diamond (✦)—full field sagittal; circle (○)—ideal. The wavelengths used in calculating the MTF plots were 0.5461 microns, 0.4800 microns, and 0.6438 microns. The wavelengths were equally weighted.

The through-focus MTF plots of FIGS. 1B, 3B, 4B, and 6B are for full fields of ±25°, while those of FIGS. 2B, 5B–5G, and 6C are for a full field of ~±20°.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive or limiting of the invention.

DETAILED DESCRIPTION OF THE INVENTION

A. Dividing the Negative Power

Figure 1A:
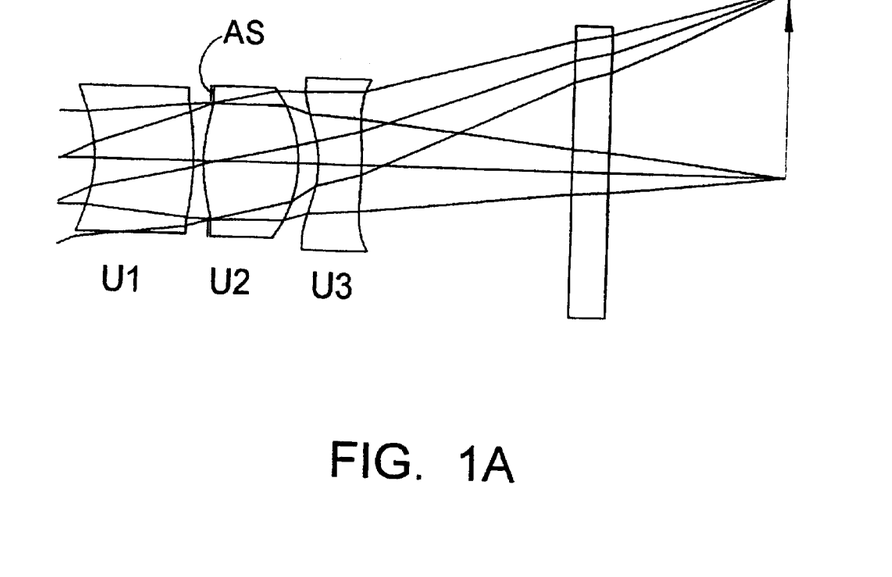
FIG. 1A is a schematic side view of an inverse triplet lens constructed in accordance with the invention and having an f# of 4.5, a semi-field of view of 25°, and a focal length (f) of 10 mm.

As discussed above, the classical triplet with its positive, negative, positive configuration suffers from both aberration correction and manufacturability problems. In accordance with the invention, the powers of the classical triplet are inverted so that the lens has three lens units with a negative (or weak positive), positive, negative configuration. FIG. 1A shows the basic structure of the inverse triplet lens of the invention.

By inverting the powers of the triplet, a different means of aberration correction is achieved. The stop is placed after the first element near the positive element, and the negative elements are allowed to be spaced somewhat from it.

Figure 1B:
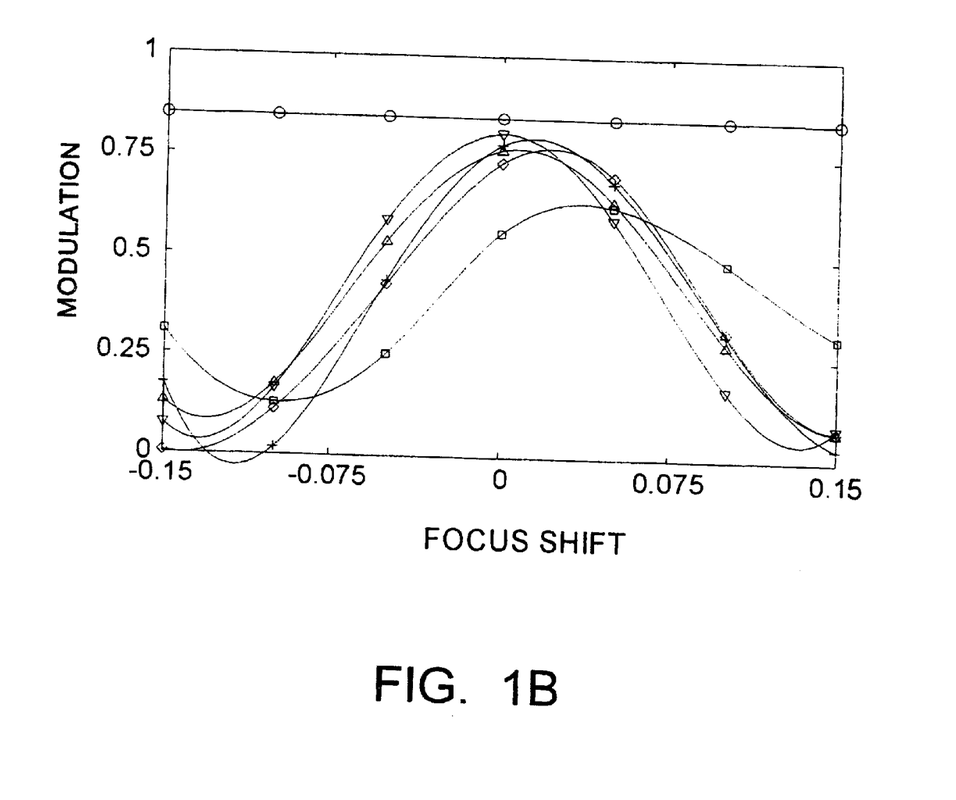
FIG. 1B is a through-focus white light MTF at 50 cycles/mm for the inverse triplet of FIG. 1A.

In an all-spherical surface design, the single positive element contributes too much spherical aberration for the negative elements to correct, but the astigmatism can be well corrected with little secondary aberration residual. Unlike astigmatism, the spherical aberration can always be corrected with aspherics, and in fact the design form can be well corrected. The through-focus MTF of FIG. 1B shows the improved astigmatism correction as compared to the classical triplet (see FIG. 6B).

B. Manufacturing Desensitization

While the inverse triplet requires aspherical surfaces for full correction, only one or two aspheres are required, depending on the field and aperture desired. For molded lenses, only the cost of tooling is increased if additional aspherics are added, and this cost is easily justified if the manufacturing yield is increased. By allowing all of the surfaces to become aspherical, the design can be tailored for particular manufacturing processing.

Figure 2A:
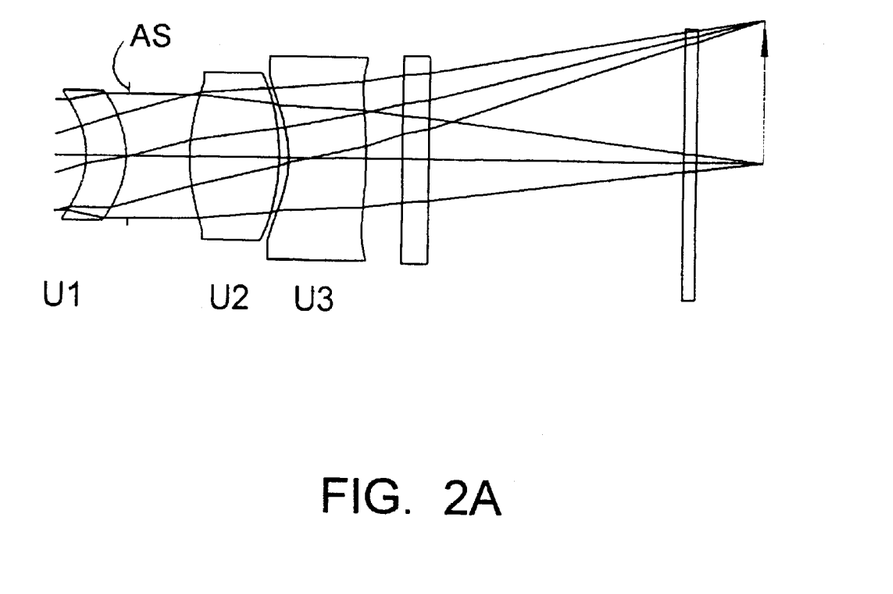
FIG. 2A is a schematic side view of a desensitized inverse triplet constructed in accordance with the invention.
Figure 2B:
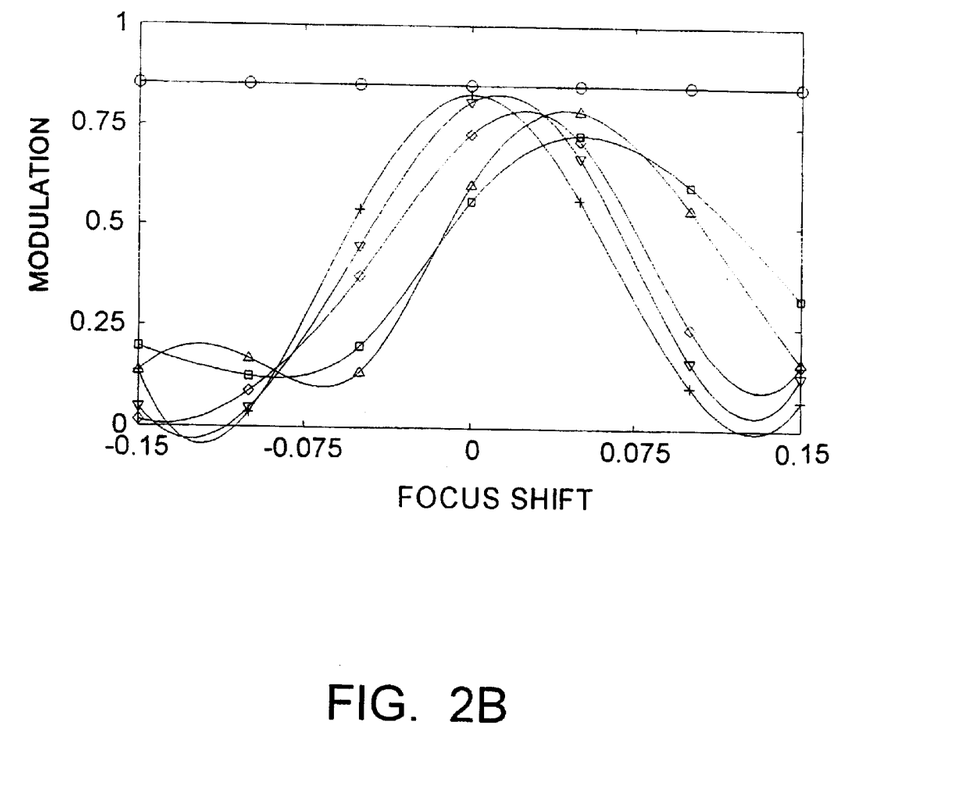
FIG. 2B is a through-focus MTF at 50 cycles/mm for the inverse triplet of FIG. 2A with the second element decentered by 0.025 mm.

FIG. 2A shows a design modified to minimize effects of tilting, decentering, and spacing errors. A comparison of through-focus MTF for about 0.75 relative field is shown in FIG. 2B where the second lens element is decentered.

Figure 6A:
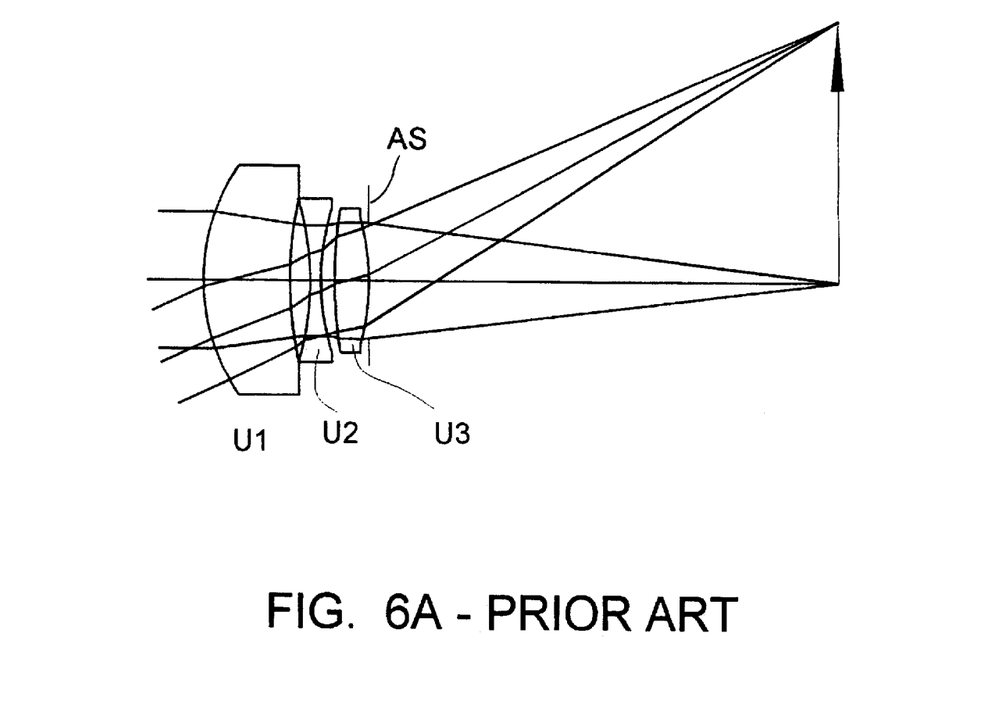
FIG. 6A is a schematic side view of a classical triplet having an f/# of 4, a semi-field of view of 25°, and a focal length (f) of 10 mm.
Figure 6B:
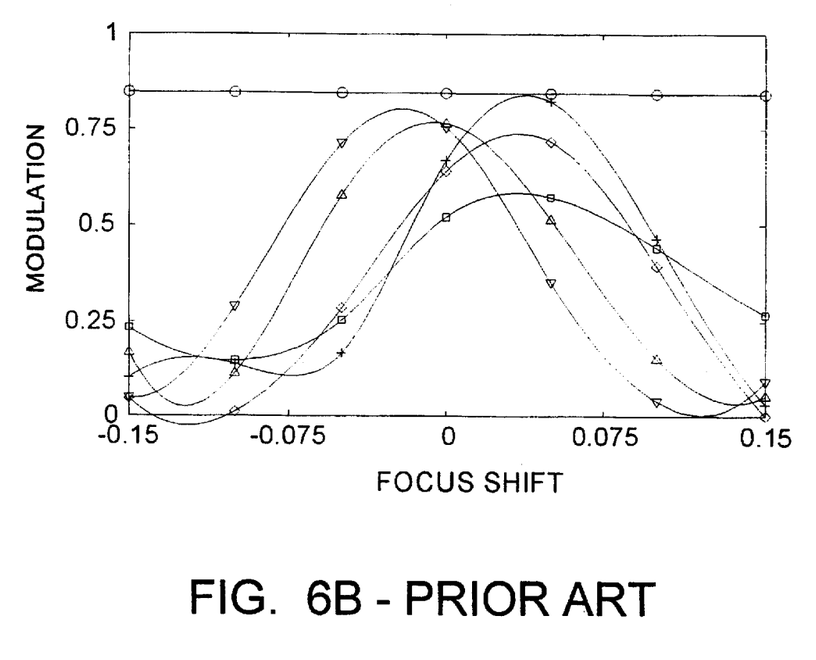
FIG. 6B is a through-focus white light MTF plot at 50 cycles/mm for the classical triplet of FIG. 6A at selected field positions.
Figure 6C:
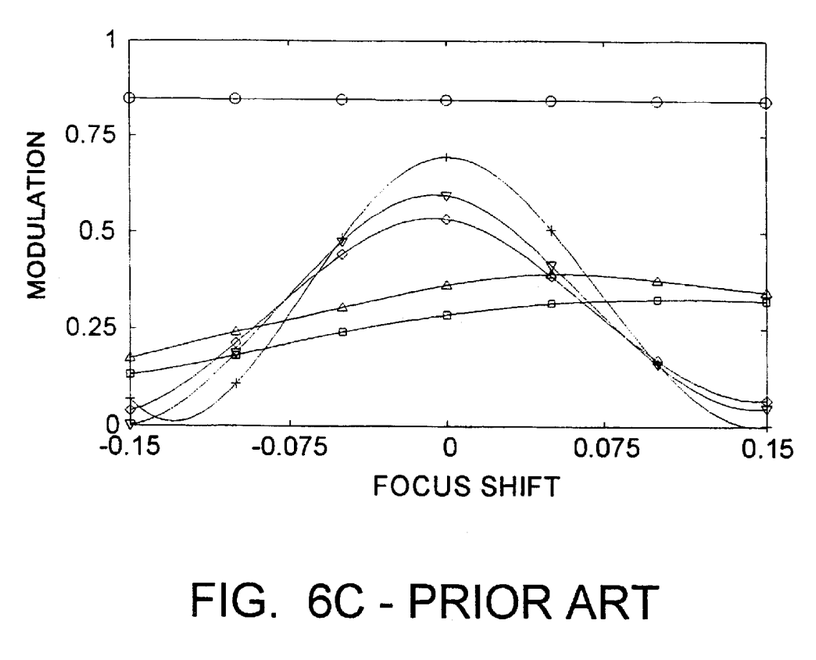
FIG. 6C is a through-focus white light MTF plot at 50 cycles/mm for the classical triplet of FIG. 6A with second element decentered by 0.025 mm.

Table 7 compares the sums of the primary and secondary aberrations for each element of the classical triplet of FIG. 6A and the desensitized inverse triplet of FIG. 2A. As can be seen in this table, the approximate aberration correction of the individual inverse triplet lens elements is better than those of the classical triplet.

For manufacturing purposes, the most important characteristic is whether any of the tolerances required is too severe for mass production, even if all of the other tolerances are very loose. The next level is the cost associated with too many restrictive tolerances. The use of multiple aspherical surfaces provides the means to accomplish both of these goals. That is, if a sufficient number of surfaces are aspherical, there are more degrees of freedom than required for aberration correction, so the lens can be optimized for manufacturability.

C. Modification for Extended Exit Pupil Position

For imaging with a single polychromatic sensor it is often necessary to limit the angle of maximum chief rays so as to avoid color artifacts caused by the separation of the color filter and the actual active sensor. Satisfying this telecentric, or nearly telecentric condition, requires additional positive power in the space between the objective lens and the image. Ideally, a lens at the image could perform the function of extending the exit pupil without introducing severe aberrations. In actual practice this space is usually occupied with filters of various types so the positive lens is removed somewhat.

By adding positive power, field curvature is increased as well, and because there is no significant choice of plastic materials, correction requires either larger size or additional negative power. The aspherical surfaces are sufficient to correct for the aberrations resulting from this increased power, and even the ability to desensitize remains.

It seems possible to place the positive lens anywhere in the image space. If it is placed near the image, shown in FIG. 3A, only spherical surfaces are required. If aspherical surfaces are used the departure from sphericity of the additional lens becomes very noticeable. This design, shown in FIG. 4A, looks like a conventional triplet with negative element added to the front. The aberration correction, however, is quite different because the stop is located a substantial distance from the central negative element.

It is interesting to note how the aspherical surfaces can be used to correct the aberrations in different ways. The sum of the Seidel and fifth order surface contributions lens element by lens element is shown in Tables 8 and 9 for the designs shown in FIGS. 3A and 4A, respectively. By adding the additional aspheres the lens of FIG. 4A has less spherical aberration per lens element, and thus is less sensitive to manufacturing errors of decentration. Because the positioning and tilting of the sensor itself can usually be adjusted to remove the effects of a tilted image, the larger lens element contribution for off-axis aberrations can be tolerated.

Figure 3A:
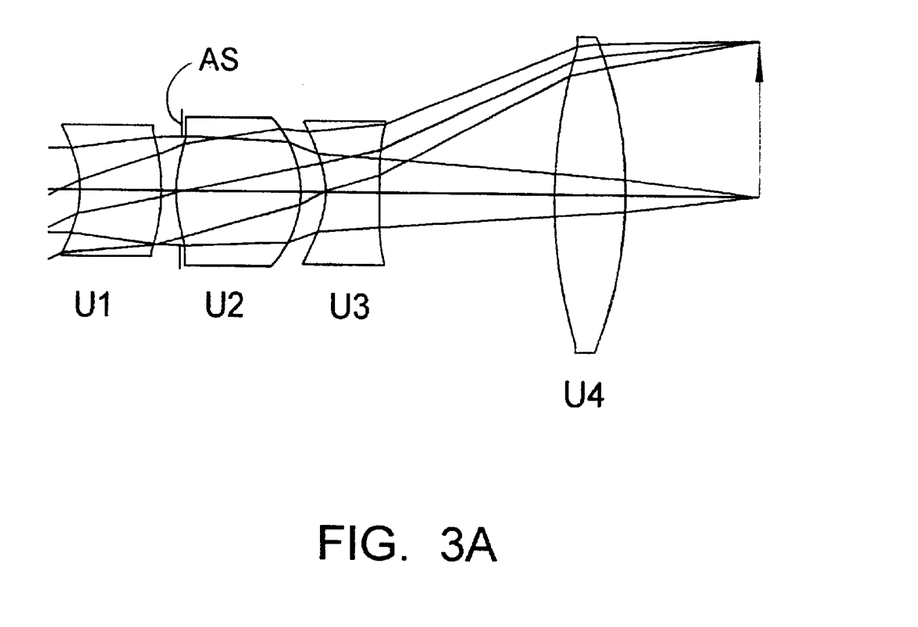
FIG. 3A is a schematic side view of an inverse triplet modified for an extended exit pupil position.
Figure 3B:
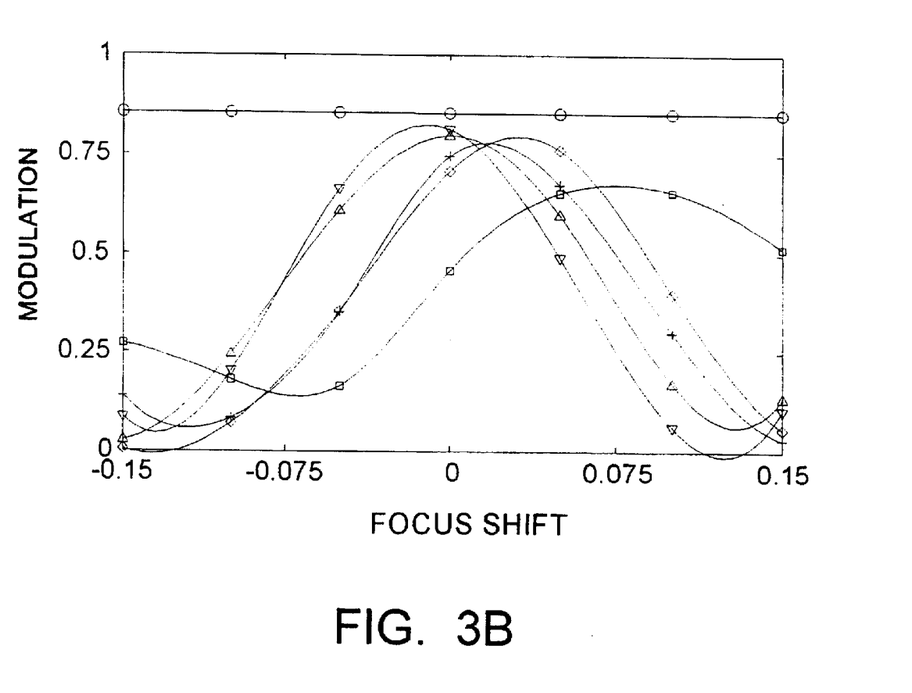
FIG. 3B is a through focus MTF at 50 cycles/mm for the inverse triplet of FIG. 3A.
Figure 4A:
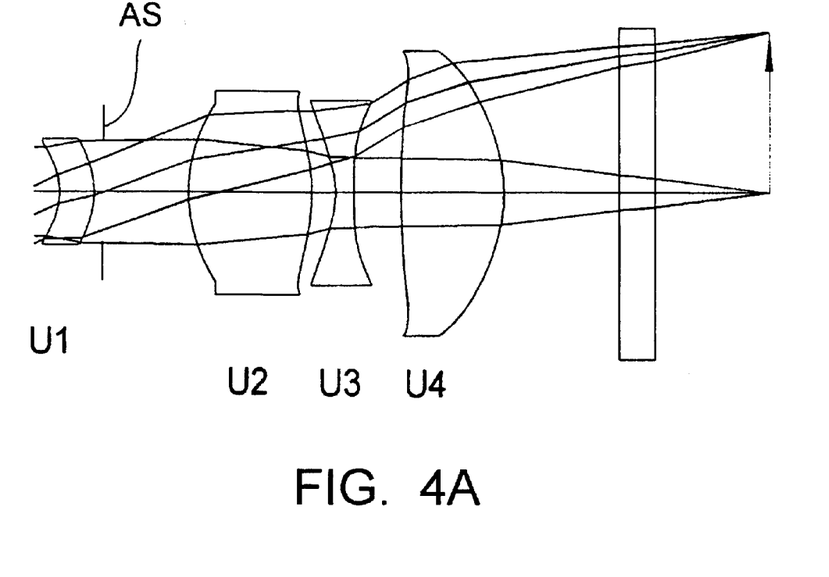
FIG. 4A is a schematic side view of an inverse triplet modified for an extended exit pupil position and a large back focal length.
Figure 4B:
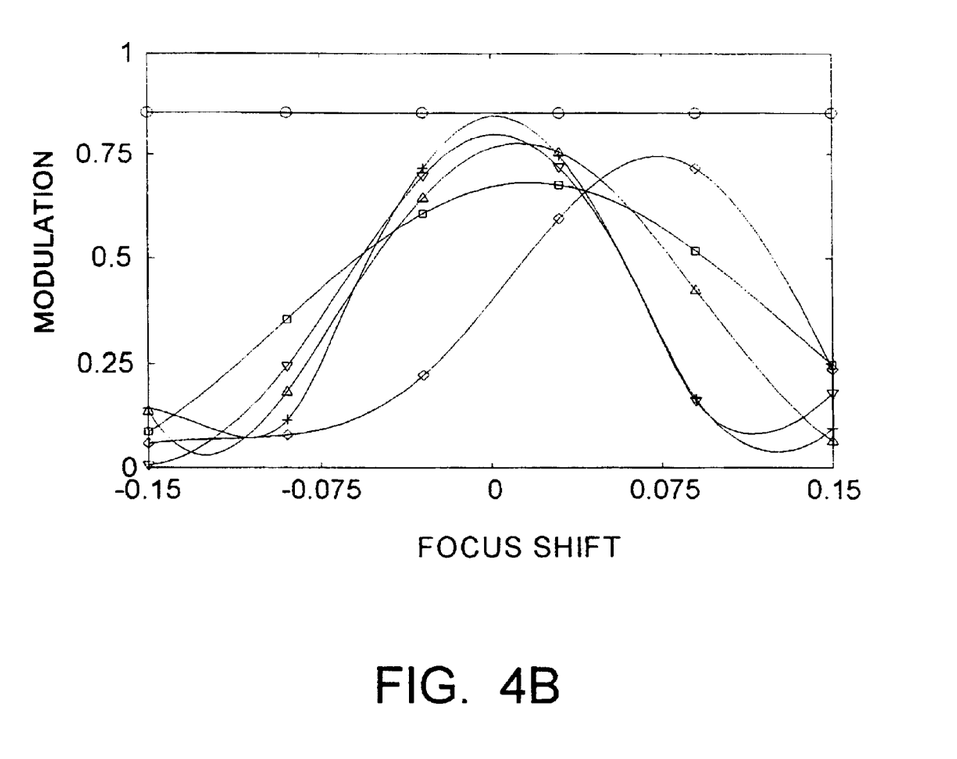
FIG. 4B is a through focus MTF at 50 cycles/mm for the inverse triplet of FIG. 4A.

The through-focus MTF at 50 cycles/mm for the extended exit pupil designs of FIGS. 3A and 4A are shown in FIGS. 3B and 4B, respectively. The designs show some astigmatism for the corner of the image (25 degrees semi-field), but compare quite favorably with the conventional triplet without the extended pupil.

Figure 5A:
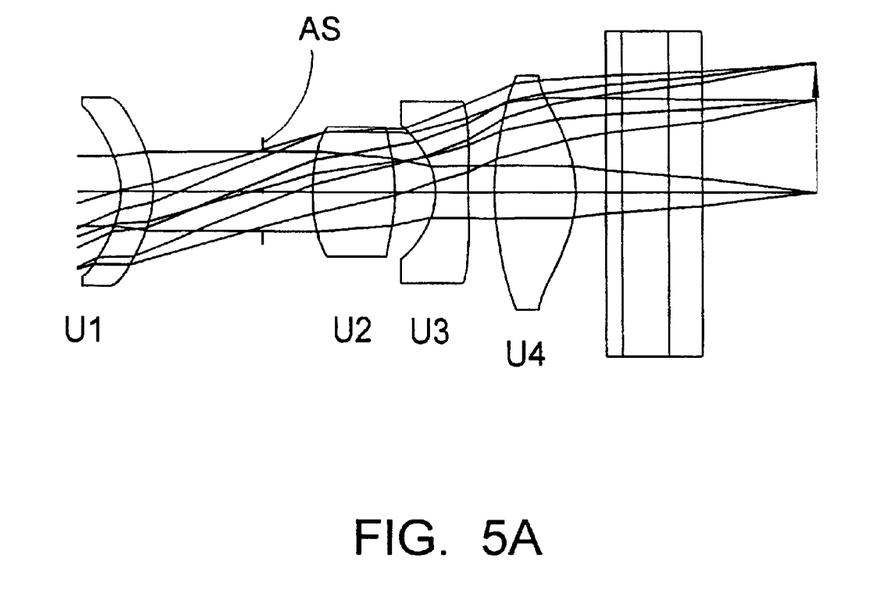
FIG. 5A is a schematic side view of a further inverse triplet having an extended exit pupil position and a large back focal length.
Figure 5B:
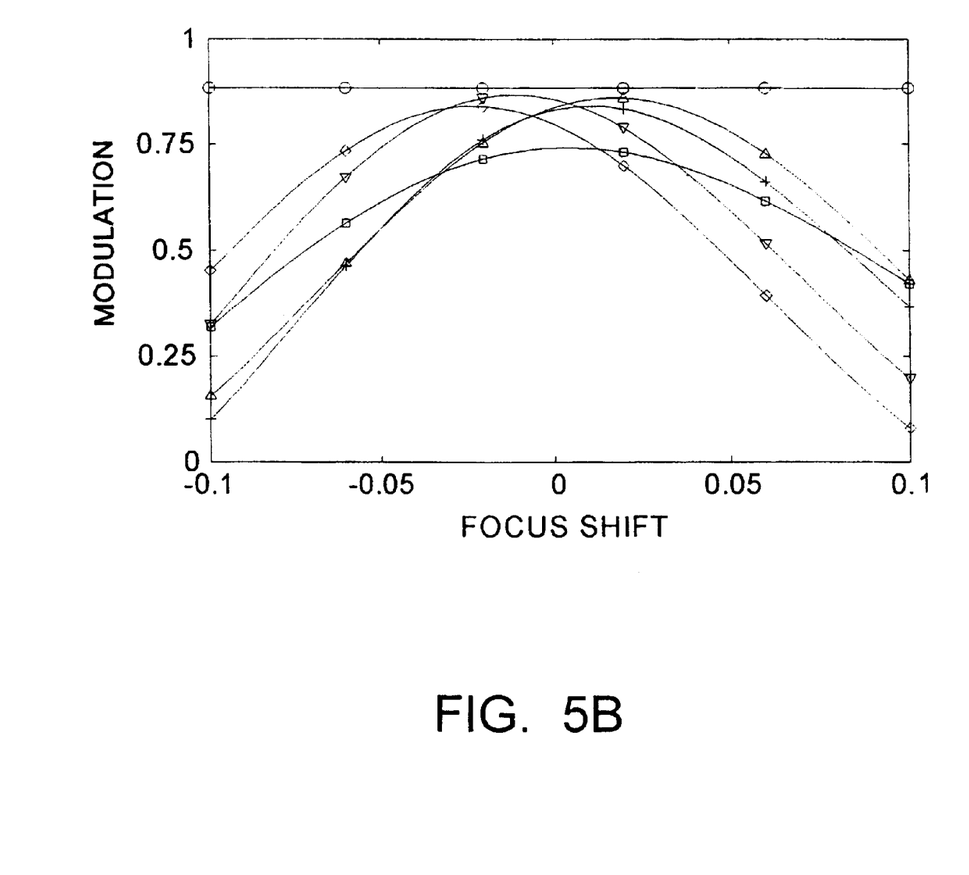
FIG. 5B is a through focus MTF at 50 cycles/mm for the inverse triplet of FIG. 5A.
Figure 5C:
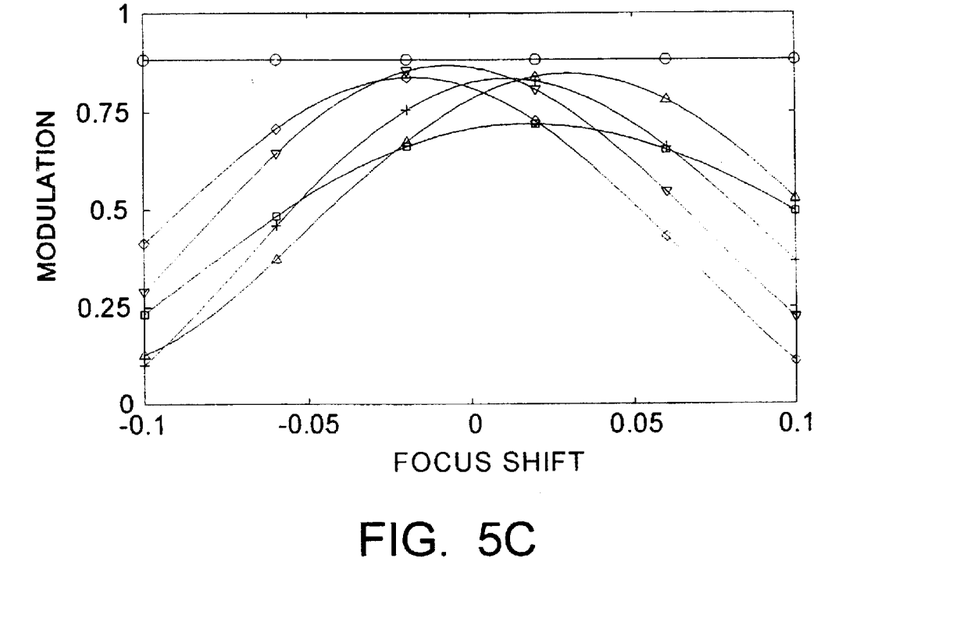
FIG. 5C is a through focus MTF at 50 cycles/mm for the inverse triplet of FIG. 5A with the first element (U1) decentered by 0.035 mm.
Figure 5D:
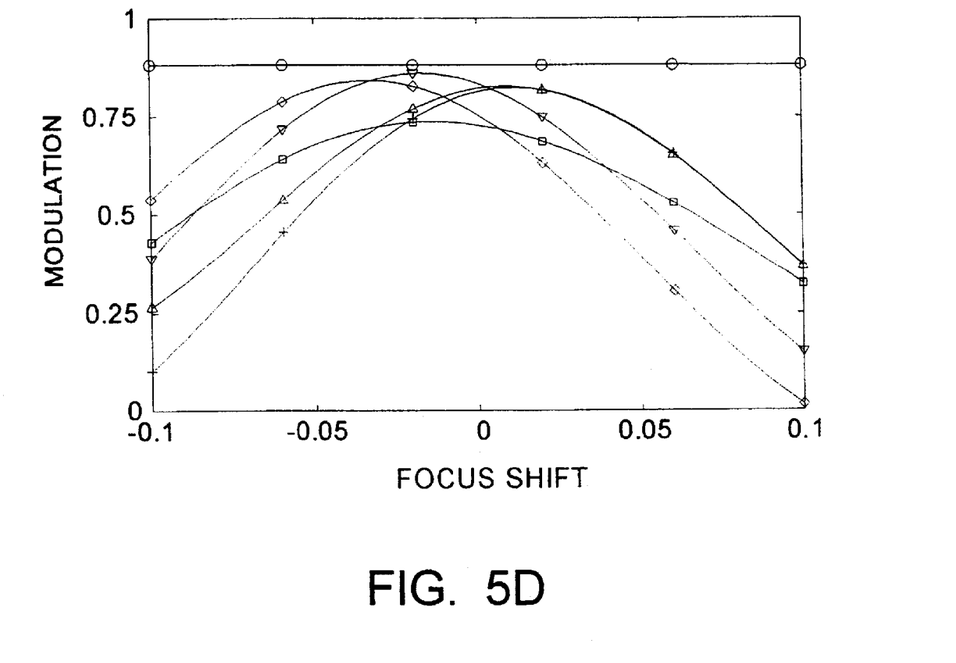
FIG. 5D is a through focus MTF at 50 cycles/mm for the inverse triplet of FIG. 5A with the second element (U2) tilted by 0.3°.
Figure 5E:
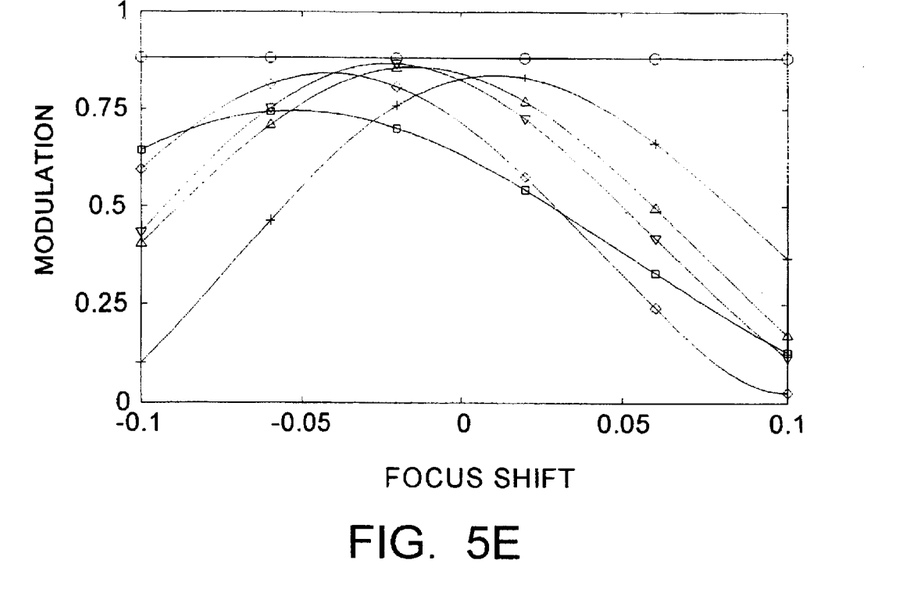
FIG. 5E is a through focus MTF at 50 cycles/mm for the inverse triplet of FIG. 5A with the third and fourth elements (U3 and U4) each tilted by 0.3°.
Figure 5F:
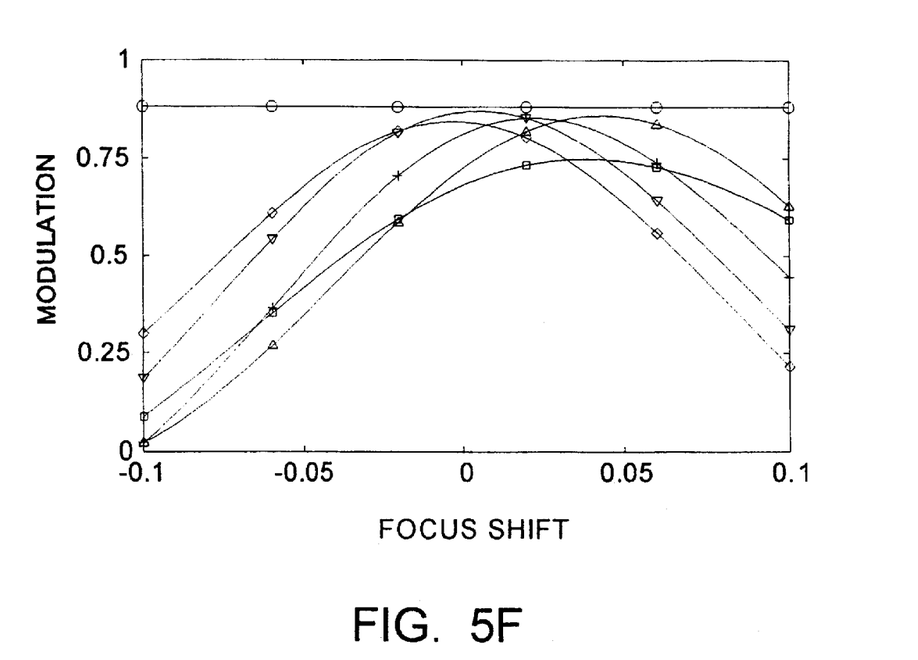
FIG. 5F is a through focus MTF at 50 cycles/mm for the inverse triplet of FIG. 5A with the air space between second and third elements (U2 and U3) changed by 0.04 mm.
Figure 5G:
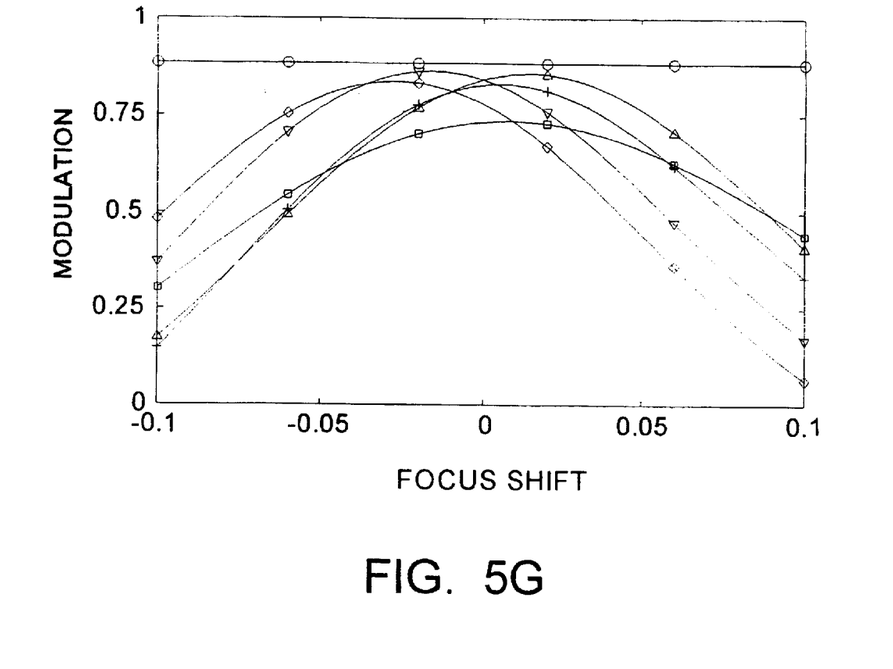
FIG. 5G is a through focus MTF at 50 cycles/mm for the inverse triplet of FIG. 5A with the thickness of the second element (U2) changed by 0.04 mm.

FIG. 5A illustrates a further lens design which (1) has an extended pupil, (2) has a long back focal length, and (3) employs sufficient aspherical surfaces so as to reduce substantially the design's sensitivity to manufacturing deviations (tolerances). In particular, a comparison of FIG. 5B with FIGS. 5C–5G demonstrates the relative insensitivity of this design to decentration (FIG. 5C), tilt (FIGS. 5D and 5E), spacing errors (FIG. 5F), and element thickness errors (FIG. 5G).

Although preferred and other embodiments of the invention have been described herein, further embodiments may be perceived by those skilled in the art without departing from the scope of the invention as defined by the following claims.

TABLE 1

| SRF | RADIUS | THICKNESS | APERTURE RADIUS | GLASS SPE NOTE |
|---|---|---|---|---|
| OBJ | — | 5.8238e+19 | 2.7157e+19 | AIR |
| 1 | −3.064874 V | 2.400264 V | 1.779136 S | ACRYL C * |
| 2 | −7.562037 V | 0.248357 V | 1.488879 S | AIR |
| AST | 3.722346 V | 2.313840 V | 1.419980 AS | ACRYL C * |
| 4 | −3.051072 V | 0.500484 V | 1.830093 S | AIR |
| 5 | −2.329861 V | 1.033262 V | 1.814661 S | STYRE C * |
| 6 | −7.191681 V | 5.000000 | 2.095155 S | AIR * |
| 7 | — | 0.874400 | 3.393300 S | BK7 C |
| 8 | — | 4.315274 S | 3.542750 S | AIR |
| IMS | — | −0.091852 V | 4.639273 S | |

*CONIC AND POLYNOMIAL ASPHERIC DATA

| SRF | CC | AD | AE | AF | AG |
|---|---|---|---|---|---|
| 1 | — | 0.016073 | −0.001518 | 0.000291 | −2.1617e-05 |
| 3 | — | −0.014628 | −0.001961 | 1.8097e-05 | −5.8687e-05 |
| 5 | — | 0.046559 | −0.000971 | −4.3232e-05 | 8.7316e-05 |
| 6 | — | 0.028145 | −0.000172 | −0.000283 | 4.1117e-05 |

*WAVELENGTHS: 0.540000 0.450000 0.620000

*REFRACTIVE INDICES

| GLASS | RN1 | RN2 | RN3 | VNBR |
|---|---|---|---|---|
| ACRYL | 1.492403 | 1.499298 | 1.488808 | 46.940121 |
| STYRE | 1.595772 | 1.611790 | 1.587636 | 24.665717 |
| BK7 | 1.519039 | 1.525320 | 1.515539 | 53.071437 |

| | | |
|---|---|---|
| Working F-number: | | 4.499908 |
| Field angle: | | 25.000000 |
| Effective focal length: | | 10.000093 |

| UNIT | POWER | EFL |
|---|---|---|
| 1 | −0.078720 | −12.703311 |
| 2 | 0.260570 | 3.837735 |
| 3 | −0.159153 | −6.283258 |

TABLE 2

| SRF | RADIUS | THICKNESS | APERTURE RADIUS | GLASS SPE NOTE |
|---|---|---|---|---|
| OBJ | — | 1.0000e+20 | 3.6397e+19 | AIR |
| 1 | −1.871869 V | 0.882563 V | 1.400000 K | ACRYL C * |
| 2 | −2.078649 V | 0.077102 | 1.468745 S | AIR * |
| AST | — | 1.362577 V | 1.443414 AS | AIR |
| 4 | 4.385774 V | 2.038735 V | 1.700000 K | ACRYL C * |
| 5 | −4.896073 V | 0.218500 | 1.982925 S | AIR * |
| 6 | −2.583927 V | 1.752980 V | 1.959875 S | CARBO C * |
| 7 | −7.200777 V | 5.000000 | 2.300000 K | AIR * |
| 8 | — | 0.873000 | 3.089841 S | BK7 C |

TABLE 2-continued

| | | | | |
|---|---|---|---|---|
| 9 | — | 3.121103 S | 3.176392 S | AIR |
| IMS | — | — | 3.646332 S | |

*CONIC AND POLYNOMIAL ASPHERIC DATA

| SRF | CC | AD | AE | AF | AG |
|---|---|---|---|---|---|
| 1 | — | 0.022092 | 0.004971 | −0.002012 | 0.000759 |
| 2 | — | 0.016915 | 0.001905 | −0.000566 | 0.000228 |
| 4 | — | −0.000542 | −0.001445 | −1.7676e−05 | −2.1005e−05 |
| 5 | — | 0.000532 | −0.000913 | 9.7818e−05 | −2.6015e−05 |
| 6 | — | 0.029750 | −0.001536 | 0.000357 | −1.7813e−05 |
| 7 | — | 0.015015 | −0.000516 | 0.000157 | −1.7916e−05 |

*WAVELENGTHS: 0.546100 0.480000 0.643800

*REFRACTIVE INDICES

| GLASS | RN1 | RN2 | RN3 | VNBR |
|---|---|---|---|---|
| ACRYL | 1.492067 | 1.496540 | 1.487978 | 57.474701 |
| CARBO | 1.590088 | 1.600365 | 1.580754 | 30.090095 |
| BK7 | 1.518721 | 1.522829 | 1.514721 | 63.978408 |

Working F-number: 4.007073
Field angle: 20.000000
Effective focal length: 10.018215

| UNIT | POWER | EFL |
|---|---|---|
| 1 | 0.010658 | 93.823764 |
| 2 | 0.197291 | 5.068654 |
| 3 | −0.125789 | −7.949799 |

TABLE 3

| SRF | RADIUS | THICKNESS | APERTURE RADIUS | GLASS SPE NOTE |
|---|---|---|---|---|
| OBJ | — | 5.8238e+19 | 2.7157e+19 | AIR |
| 1 | −2.668669 V | 2.400985 V | 1.886256 S | ACRYL C * |
| 2 | −5.645963 V | 0.432900 V | 1.695983 S | AIR |
| AST | 3.787009 V | 3.639209 V | 1.580753 AS | ACRYL C * |
| 4 | −3.143441 V | 0.721000 V | 2.143264 S | AIR |
| 5 | −2.452537 V | 1.551295 V | 2.067523 S | STYRE C * |
| 6 | −42.455643 V | 5.000000 | 2.000000 K | AIR * |
| 7 | 15.018072 V | 2.000000 | 4.267459 S | BK7 C |
| 8 | −12.712902 V | 3.861206 S | 4.550894 S | AIR |
| IMS | — | −0.038531 V | 4.663557 S | |

*CONIC AND POLYNOMIAL ASPHERIC DATA

| SRF | CC | AD | AE | AF | AG |
|---|---|---|---|---|---|
| 1 | — | 0.019180 | −0.001186 | 0.000194 | 2.4289e−06 |
| 3 | — | −0.011463 | −0.000298 | −5.0005e−05 | −3.0879e−05 |
| 5 | — | 0.027499 | −0.001863 | 0.000268 | 2.1667e−05 |
| 6 | — | 0.016636 | −0.001448 | 0.000153 | −1.0934e−05 |

*WAVELENGTHS: 0.540000 0.450000 0.620000

*REFRACTIVE INDICES

| SRF | GLASS | RN1 | RN2 | RN3 | VNBR |
|---|---|---|---|---|---|
| 1 | ACRYL | 1.492403 | 1.499298 | 1.488806 | 46.940121 |
| 3 | ACRYL | 1.492403 | 1.499298 | 1.488808 | 46.940121 |
| 5 | STYRE | 1.595772 | 1.611790 | 1.587636 | 24.665717 |
| 7 | BK7 | 1.519039 | 1.525320 | 1.515539 | 53.071437 |

Working F-number: 4.201221
Field angle: 25.000000
Effective focal length: 10.003465

| UNIT | POWER | EFL |
|---|---|---|
| 1 | −0.071410 | −14.003548 |

TABLE 3-continued

| | | |
|---|---|---|
| 2 | 0.237003 | 4.219364 |
| 3 | −0.225574 | −4.433135 |
| 4 | 0.073531 | 13.599728 |

TABLE 4

| SRF | RADIUS | THICKNESS | APERTURE RADIUS | GLASS SPE NOTE |
|---|---|---|---|---|
| OBJ | — | 1.0000e+20 | 4.6631e+19 | AIR |
| 1 | −1.981542 V | 0.956852 V | 1.400000 K | ACRYL C * |
| 2 | −2.437039 V | 0.094142 | 1.420000 | AIR * |
| AST | — | 2.527223 V | 1.430000 AK | AIR |
| 4 | 4.551250 V | 3.503587 V | 3.170000 | ACRYL C * |
| 5 | −5.535989 V | 0.667224 | 3.170000 | AIR * |
| 6 | −2.557747 V | 0.517987 V | 2.880000 | CARBO C * |
| 7 | −7.7229e+03 V | 1.338772 | 2.600000 K | AIR * |
| 8 | 35.060881 V | 2.904450 V | 4.000000 | ACRYL C * |
| 9 | −4.739874 V | 3.277058 | 4.000000 | AIR * |
| 10 | — | 1.000000 | 5.000000 | BK7 C |
| 11 | — | 3.287032 S | 5.000000 | AIR |
| IMS | — | −0.036095 V | 4.662896 S | |

*CONIC AND POLYNOMIAL ASPHERIC DATA

| SRF | CC | AD | AE | AF | AG |
|---|---|---|---|---|---|
| 1 | — | 0.025922 | 0.002042 | −0.000232 | 0.000238 |
| 2 | — | 0.015826 | −0.000156 | 0.000365 | −5.1713e−05 |
| 4 | — | 0.001478 | −0.000500 | 5.3849e−05 | −1.3072e−06 |
| 5 | — | 0.003161 | 0.001368 | −0.000325 | 2.6057e−05 |
| 6 | −1.000000 | 0.032196 | −0.004592 | 0.000323 | −7.2973e−06 |
| 7 | — | 0.026643 | −0.003928 | 0.000316 | −1.1361e−05 |
| 8 | — | −5.3670e−05 | 0.000288 | −2.8108e−05 | 4.8652e−07 |
| 9 | — | 0.002044 | −0.000103 | 1.4479e−05 | −6.6382e−07 |

*WAVELENGTHS: 1 0.546100 0.480000 0.643800

*REFRACTIVE INDICES

| GLASS | RN1 | RN2 | RN3 | VNBR |
|---|---|---|---|---|
| CARBO | 1.590088 | 1.600365 | 1.580754 | 30.090095 |
| ACRYL | 1.492067 | 1.496540 | 1.487978 | 57.474701 |
| BK7 | 1.518721 | 1.522829 | 1.514721 | 63.978408 |

Working F-number: 3.999787
Field angle: 25.000000
Effective focal length: 10.000000

| UNIT | POWER | EFL |
|---|---|---|
| 1 | −0.014259 | −70.129963 |
| 2 | 0.174436 | 5.732754 |
| 3 | −0.230624 | −4.336065 |
| 4 | 0.115013 | 8.694691 |

TABLE 5

| SRF | RADIUS | THICKNESS | APERTURE RADIUS | GLASS SPE NOTE |
|---|---|---|---|---|
| OBJ | — | 1.8280e+03 | 908.000000 | AIR |
| 1 | −2.702181 V | 0.993383 V | 2.250000 | ACRYL C * |
| 2 | −3.057447 V | 3.503000 | 2.300000 | AIR * |
| AST | — | 1.526000 | 1.230000 AK | AIR |
| 4 | 5.478221 V | 2.593481 V | 1.900000 | ACRYL C * |
| 5 | −5.441035 V | 1.255000 | 1.960000 | AIR * |
| 6 | −2.181334 V | 1.000000 | 1.960000 | CARBO C * |
| 7 | 21.138383 | 0.800000 | 2.700000 | AIR * |
| 8 | 7.220047 V | 2.505124 | 3.400000 | ACRYL C * |
| 9 | −3.781015 V | 1.280000 | 3.500000 | AIR * |
| 10 | — | 0.500000 | 5.000000 | GLASS16 M |
| 11 | — | — | 5.000000 | AIR |

TABLE 5-continued

| 12 | — | 1.400000 | 5.000000 | GLASS18 M |
| 13 | — | — | 5.000000 | AIR |
| 14 | — | 1.000000 | 5.000000 | BK7 C |
| 15 | — | 3.096984 S | 5.000000 | AIR |
| IMS | — | −0.020000 | 5.000000 | |

*CONIC AND POLYNOMIAL ASPHERIC DATA

| SRF | CC | AD | AE | AF | AG |
|---|---|---|---|---|---|
| 1 | — | 0.010789 | 0.000437 | 3.4575e−05 | 8.5312e−06 |
| 2 | — | 0.008419 | 8.2533e−05 | 8.7405e−05 | −6.4345e−06 |
| 4 | — | 0.002926 | 0.000486 | 5.2554e−06 | 1.9254e−06 |
| 5 | −0.500000 | 0.003504 | 7.6571e−05 | 0.000364 | −4.5360e−05 |
| 6 | — | 0.004121 | 0.002268 | 0.000353 | 2.1025e−05 |
| 7 | — | −0.009885 | 0.000660 | 7.1870e−05 | −1.1261e−05 |
| 8 | — | −0.003873 | −7.1717e−05 | 4.5720e−05 | −2.1033e−06 |
| 9 | — | 0.004438 | 0.000142 | −1.1630e−05 | 2.0009e−06 |

*WAVELENGTHS: 0.546100 0.480000 0.643800

*REFRACTIVE INDICES

| GLASS | RN1 | RN2 | RN3 | VNBR |
|---|---|---|---|---|
| CARBO | 1.590088 | 1.600365 | 1.580754 | 30.090095 |
| ACRYL | 1.492067 | 1.496540 | 1.487978 | 57.474701 |
| GLASS16 | 1.518721 | 1.522835 | 1.514727 | 63.978408 |
| GLASS18 | 1.550000 | 1.555122 | 1.545122 | 55.000000 |

| | |
|---|---|
| Working F-number: | 4.010265 |
| Field angle: | 26.372434 |
| Effective focal length: | 8.708503 |

| UNIT | POWER | EFL |
|---|---|---|
| 1 | −0.001647 | −607.021954 |
| 2 | 0.166139 | 6.019058 |
| 3 | −0.303181 | −3.298355 |
| 4 | 0.183403 | 5.452484 |

TABLE 6

PRIOR ART

| SRF | RADIUS | THICKNESS | APERTURE RADIUS | GLASS SPE NOTE |
|---|---|---|---|---|
| OBJ | — | 1.0000e+19 | 4.6631e+18 | AIR |
| 1 | 3.618229 V | 1.516310 V | 2.021492 K | GLASS1 M |
| 2 | 6.708656 V | 0.357025 | 1.458777 | AIR |
| 3 | −5.035902 V | 0.186013 | 1.445575 | GLASS3 M |
| 4 | 4.352446 V | 0.241346 V | 1.283532 | AIR |
| 5 | 8.221513 V | 0.602167 V | 1.271637 | GLASS5 M |
| 6 | −4.236010 V | 0.081008 V | 1.126154 | AIR |
| AST | — | 8.299840 S | 1.010817 AK | AIR |
| IMS | — | −0.073304 V | 4.631058 S | |

*WAVELENGTHS: 0.587560 0.480000 0.643800

*REFRACTIVE INDICES

| GLASS | RN1 | RN2 | RN3 | VNBR |
|---|---|---|---|---|
| GLASS1 | 1.744000 | 1.754114 | 1.740592 | 55.022000 |
| GLASS3 | 1.784700 | 1.803037 | 1.778831 | 32.418000 |
| GLASS5 | 1.834000 | 1.847665 | 1.829490 | 45.885000 |

| | |
|---|---|
| Working F-number: | 4.000002 |
| Field angle: | 25.000000 |
| Effective focal length: | 10.000005 |

| UNIT | POWER | EFL |
|---|---|---|
| 1 | 0.114551 | 8.729745 |
| 2 | −0.339039 | −2.949517 |

TABLE 6-continued

PRIOR ART

| | | |
|---|---|---|
| 3 | 0.291767 | 3.427392 |

TABLE 7

| Classical | SA | CMA | AST | Inverse | SA | CMA | AST |
|---|---|---|---|---|---|---|---|
| Element 1 | −.053 | −.017 | −.088 | Element 1 | −.020 | .099 | .083 |
| Element 2 | .203 | −.034 | .522 | Element 2 | −.092 | .097 | −.134 |
| Element 3 | −.150 | .054 | −.429 | Element 3 | .089 | −.171 | −.005 |

TABLE 8

| Lens Element | SA | CMA | AST | DIST |
|---|---|---|---|---|
| 1 | .376 | .140 | .012 | −.373 |
| 2 | −.041 | −.099 | −.103 | −.069 |
| 3 | .425 | −.025 | .002 | .461 |
| 4 | −.003 | −.006 | .036 | −.235 |

TABLE 9

| Lens Element | SA | CMA | AST | DIST |
|---|---|---|---|---|
| 1 | −.126 | .013 | .096 | −.245 |
| 2 | −.062 | .269 | .234 | .209 |
| 3 | .089 | −.153 | .229 | −1.67 |
| 4 | −.025 | −.034 | −.660 | .503 |

What is claimed is:

1. An optical system for producing an image of an object, said system having an object side, an image side, an overall positive focal length $f_O$, and comprising in order from its object side to its image side of:
   (a) a first lens unit having:
      (i) a negative power or a weak positive power; and
      (ii) an object side surface and an image side surface;
   (b) a second lens unit having:
      (i) a positive power; and
      (ii) an object side surface and an image side surface; and
   (c) a third lens unit having a negative power, the magnitude of the focal length of the third lens unit being less than 1.5 times $f_O$;
   wherein:
      (i) each of the first, second, and third lens units comprises at least one aspherical surface; and
      (ii) said optical system has an aperture stop between the object side surface of the first lens unit and the image side surface of the second lens unit.

2. An optical system for producing an image of an object, said system having an object side, an image side, an overall positive focal length $f_O$, and comprising in order from its object side to its image side of:
   (a) a first lens unit having:
      (i) a negative power or a weak positive power; and
      (ii) an object side surface and an image side surface;
   (b) a second lens unit having:
      (i) a positive power; and
      (ii) an object side surface and an image side surface; and
   (c) a third lens unit having a negative power, the magnitude of the focal length of the third lens unit being less than 1.5 times $f_O$;

wherein:
(i) said optical system has at least one aspherical surface;
(ii) said optical system has an aperture stop between the object side surface of the first lens unit and the image side surface of the second lens unit; and
(iii) the components of the optical system with optical power consist of just the first, second, and third lens units.

3. An optical system for producing an image of an object, said system having an object side, an image side, an overall positive focal length $f_0$, and comprising in order from its object side to its image side of:
(a) a first lens unit having:
(i) a negative power or a weak positive power; and
(ii) an object side surface and an image side surface;
(b) a second lens unit having:
(i) a positive power; and
(ii) an object side surface and an image side surface; and
(c) a third lens unit having a negative power, the magnitude of the focal length of the third lens unit being less than 1.5 times $f_0$;
wherein:
(i) said optical system has at least one aspherical surface;
(ii) said optical system has an aperture stop between the object side surface of the first lens unit and the image side surface of the second lens unit; and
(iii) the distance from the object side of the first lens unit to the image is less than 2 times $f_0$.

4. The optical system of claim 1, 2, or 3 wherein at least two of the first, second, and third lens units comprises two aspherical surfaces.

5. The optical system of claim 1, 2, or 3 wherein each of the first, second, and third lens units comprises two aspherical surfaces.

6. The optical system of claim 1, 2, or 3 wherein each of the first, second, and third lens units consists of a single lens element.

7. The optical system of claim 1 or 3 wherein the components of the optical system with optical power consist of just the first, second, and third lens units.

8. The optical system of claim 7 wherein the first, second, and third lens units each consists of a single lens element.

9. The optical system of claim 1 or 3 further comprising a fourth lens unit on the image side of the third lens unit, said fourth lens unit having a positive power.

10. The optical system of claim 9 wherein the fourth lens unit comprises at least one aspherical surface.

11. The optical system of claim 9 wherein each of the first, second, third, and fourth lens units consists of a single lens element.

12. The optical system of claim 9 wherein the components of the optical system with optical power consist of just the first, second, third, and fourth lens units.

13. The optical system of claim 12 wherein the first, second, third, and fourth lens units each consists of a single lens element.

14. The optical system of claim 1, 2, or 3 wherein all lens elements used in the optical system are made from moldable materials.

15. The optical system of claim 9 wherein all lens elements used in the optical system are made from moldable materials.

16. The optical system of claim 1, 2, or 3 wherein the back focal length of the optical system is at least 0.5 times $f_0$.

17. The optical system of claim 9 wherein the back focal length of the optical system is at least 0.5 times $f_0$.

18. The optical system of claim 9 wherein the exit pupil of the optical system is located at a distance from the image of at least 2 times $f_0$.

19. The optical system of claim 1 or 2 wherein the distance from the object side of the first lens unit to the image is less than 2 times $f_0$.

20. The optical system of claim 9 wherein the distance from the object side of the first lens unit to the image is less than 2 times $f_0$.

21. The optical system of claim 1, 2, or 3 wherein at least one surface of the lens element nearest the image has an inflection.

22. The optical system of claim 9 wherein at least one surface of the lens element nearest the image has an inflection.

23. The optical system of claim 1, 2, or 3 wherein the system has a half field of view in the direction of the object of at least 25°.

24. The optical system of claim 9 wherein the system has a half field of view in the direction of the object of at least 25°.

25. The optical system of claim 1, 2, or 3 wherein the system has a relative aperture of less than f/5.

26. The optical system of claim 9 wherein the system has a relative aperture of less than f/5.

27. The optical system of claim 1, 2, or 3 wherein the system comprises sufficient aspherical surfaces to substantially correct third and fifth order aberrations and to substantially reduce the system's sensitivity to manufacturing deviations.

28. The optical system of claim 9 wherein the system comprises sufficient aspherical surfaces to substantially correct third and fifth order aberrations and to substantially reduce the system's sensitivity to manufacturing deviations.

29. A digital camera comprising the optical system of claim 1, 2, or 3 and a digital light sensor.

30. A digital camera comprising the optical system of claim 9 and a digital light sensor.

31. An optical system comprising first and second lens elements, the first lens element having first and second aspherical surfaces and the second lens element having third and fourth aspherical surfaces, wherein the first and second aspherical surfaces at least partially correct at least one primary aberration of the first lens element and the third and fourth aspherical surfaces at least partially correct at least one primary aberration of the second lens element, said corrections being sufficient to reduce the sensitivity of the optical system to at least one manufacturing tolerance.

32. The optical system of claim 31 wherein the first and second aspherical surfaces at least partially correct the spherical aberration of the first lens element and the third and fourth aspherical surfaces at least partially correct the spherical aberration of the second lens element.

33. The optical system of claim 31 wherein the first lens element has a positive power and the second lens element has a negative power.

* * * * *